United States Patent
Merrill

(12) United States Patent (10) Patent No.: US 10,792,568 B1
Merrill (45) Date of Patent: Oct. 6, 2020

(54) PATH MANAGEMENT FOR VIRTUAL ENVIRONMENTS

(71) Applicant: Amazon Technologies, Inc., Reno, NV (US)

(72) Inventor: Bill L. Merrill, Foothill Ranch, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 16/139,579

(22) Filed: Sep. 24, 2018

(51) Int. Cl.
*A63F 13/00* (2014.01)
*A63F 9/24* (2006.01)
*A63F 13/56* (2014.01)
*G06T 13/40* (2011.01)
*G06T 19/00* (2011.01)

(52) U.S. Cl.
CPC .............. *A63F 13/56* (2014.09); *G06T 13/40* (2013.01); *G06T 19/003* (2013.01); *A63F 2300/643* (2013.01); *A63F 2300/646* (2013.01)

(58) Field of Classification Search
None
See application file for complete search history.

(56) References Cited

U.S. PATENT DOCUMENTS

| | | | | |
|---|---|---|---|---|
| 8,706,413 B2* | 4/2014 | Gupta | .................. | G01C 21/206 701/400 |
| 9,199,668 B2* | 12/2015 | Zeng | .................. | B62D 15/0265 |
| 10,406,438 B2* | 9/2019 | Catlin | ................... | A63F 13/56 |
| 10,460,075 B2* | 10/2019 | Hasegawa | .......... | A61B 10/0233 |
| 2005/0071306 A1* | 3/2005 | Kruszewski | ............ | A63F 13/10 706/47 |
| 2007/0265087 A1* | 11/2007 | Akahori | ................ | A63F 13/803 463/37 |
| 2007/0276709 A1* | 11/2007 | Trimby | ................... | A63F 13/00 705/6 |
| 2008/0220862 A1* | 9/2008 | Axelrod | ................ | G06T 11/206 463/31 |
| 2009/0150790 A1* | 6/2009 | Wilhelm | ................. | A63F 13/10 715/737 |
| 2009/0197686 A1* | 8/2009 | Bergelt | ................... | A63F 13/10 463/43 |
| 2010/0235608 A1* | 9/2010 | Armoni | ............... | G06F 15/8023 712/17 |
| 2010/0323795 A1* | 12/2010 | Yamashita | ............ | A63F 13/803 463/36 |

(Continued)

Primary Examiner — Milap Shah
(74) *Attorney, Agent, or Firm* — Hogan Lovells US LLP

(57) ABSTRACT

Navigation paths through complex physical or virtual spaces can be determined without the need to transmit complex map data for the spaces, avoiding issues with additional latency or bandwidth. In a video game environment, a path can be determined for a non-player character through a level of the game. A pathfinding algorithm can be used to determine a path from a start point to an end point in the level. A virtual element can be swept along the path to determine significant spatial variations. Spatial information, such as may include different radius values for a virtual sphere able to pass through these variations, can be provided along with the coordinates of the points used to approximate the path. A path following service can utilize the spatial information to direct the character along the path in a more natural way for that character based upon factors such kinematic limitations.

20 Claims, 9 Drawing Sheets

(56) References Cited

U.S. PATENT DOCUMENTS

| | | | |
|---|---|---|---|
| 2011/0055734 A1* | 3/2011 | Borst | A63F 13/795 |
| | | | 715/757 |
| 2016/0358378 A1* | 12/2016 | Wang | G06Q 10/047 |
| 2017/0312632 A1* | 11/2017 | Curley | A63F 13/60 |
| 2018/0005426 A1* | 1/2018 | Desjardins | A63F 13/52 |
| 2018/0012403 A1* | 1/2018 | Luo | A63F 13/358 |
| 2018/0104584 A1* | 4/2018 | Utsugi | A63F 13/211 |
| 2018/0165866 A1* | 6/2018 | Feier | G07F 17/32 |
| 2018/0250595 A1* | 9/2018 | Kurabayashi | A63F 13/35 |

* cited by examiner

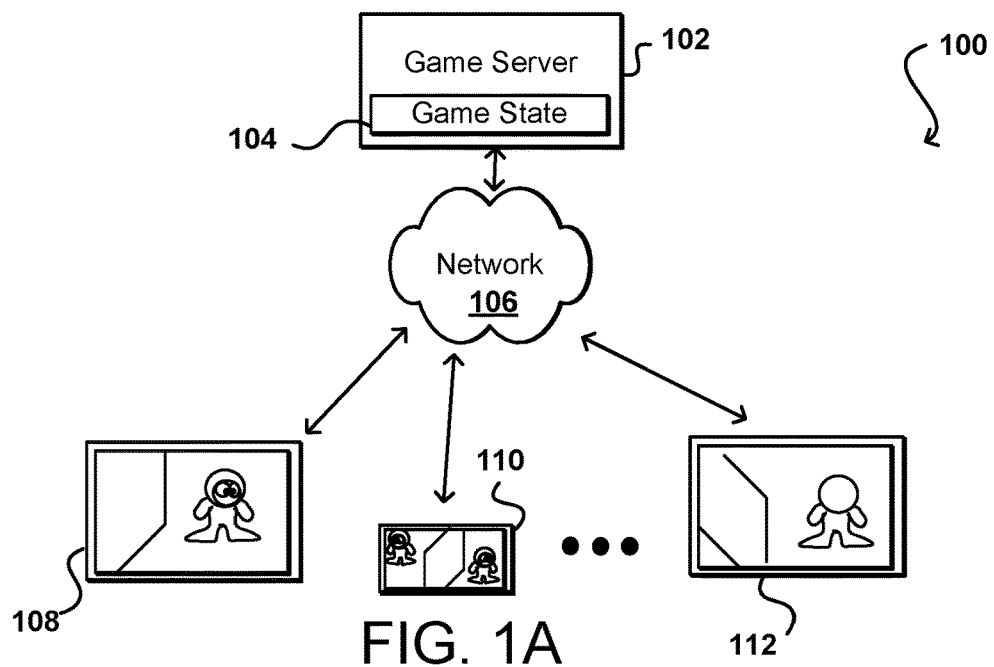
FIG. 1A
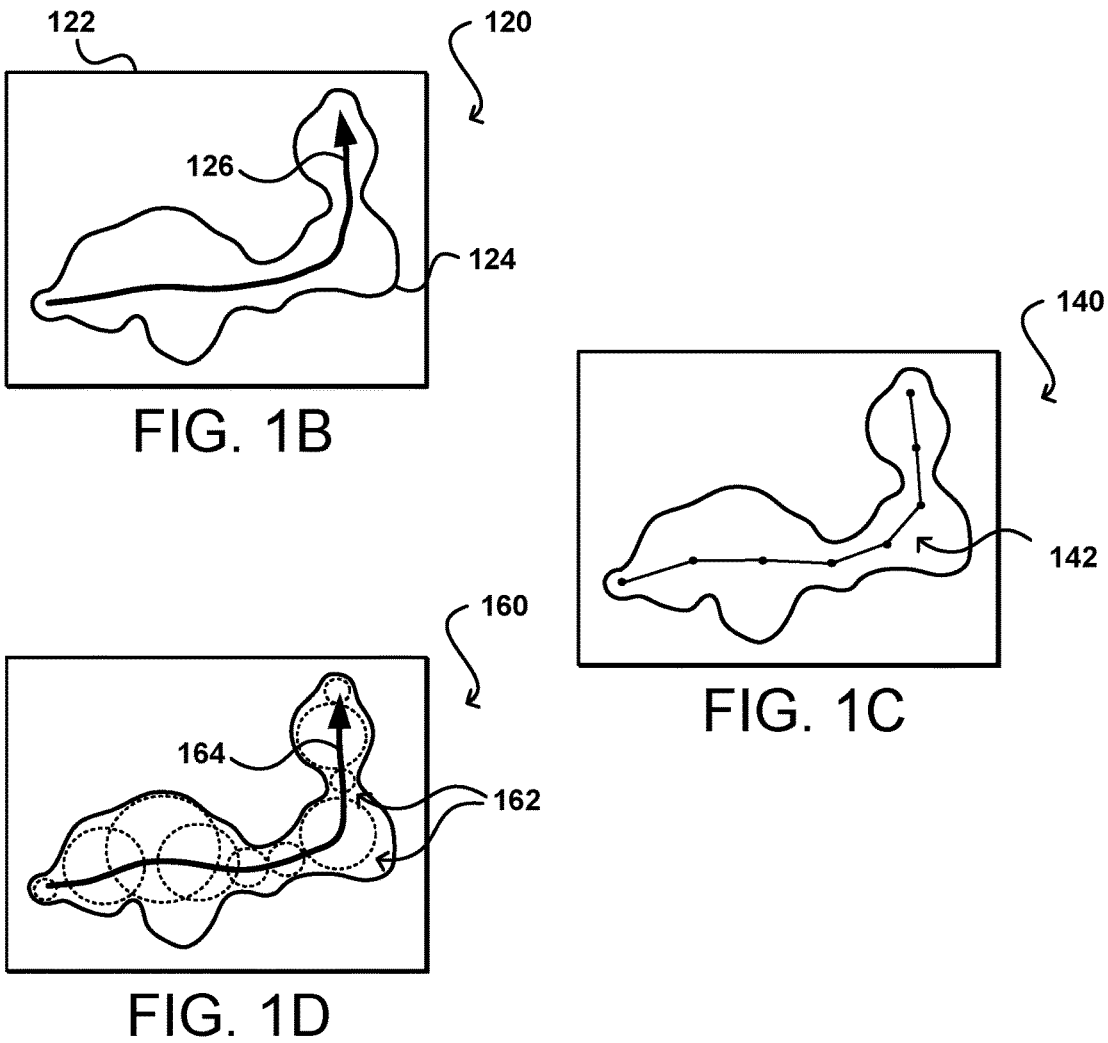
FIG. 1B
FIG. 1C
FIG. 1D

PATH MANAGEMENT FOR VIRTUAL ENVIRONMENTS

BACKGROUND

The widespread adoption of a variety of computing devices has resulted in a corresponding increase in the variety of applications available to users. For gaming applications, many of these games enable users to engage in online multiplayer games, which may be hosted by a central gaming server. In order to provide for scalability and reduce latency, among other advantages, many of these games are hosted using distributed systems. Such systems are used for other types of computer applications as well. Distributed systems have various disadvantages, however, as certain applications require large amounts of data to be transferred between different devices. In addition to consuming additional bandwidth and resources, the need to transfer large amounts of data can introduce a significant amount of latency into the functionality of the application, which can be unacceptable for applications such as online gaming or robotic control applications.

BRIEF DESCRIPTION OF THE DRAWINGS

Various embodiments in accordance with the present disclosure will be described with reference to the drawings, in which:

FIGS. 1A, 1B, 1C, and 1D illustrate example path determinations for an electronic game environment that can be generated in accordance with various embodiments.

DETAILED DESCRIPTION

Figure 2A:
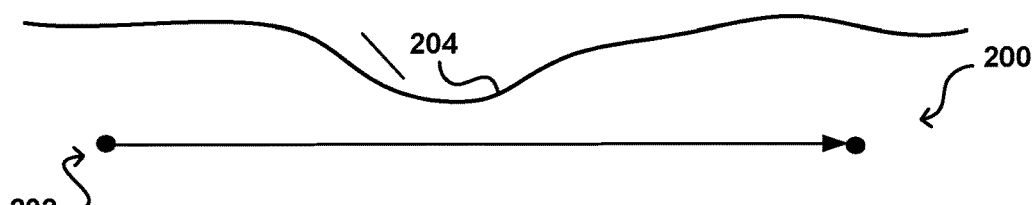
FIGS. 2A, 2B, 2C, 2D, and 2E illustrate approaches for determining path information for a virtual environment that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of agent navigation in an arbitrary or potentially complex environment. In particular, various approaches provide for the determination of paths of motion through physical or virtual environments, as well as ways in which agents should follow that path based on various motion-related parameters associated with those agents. For example, in a video game environment a path can be determined for a non-player character through a level of the game. Since the services used to host the game may be distributed, it may not be practical to enable full, high resolution map information to be transmitted between components for dynamic path determination purposes. Accordingly, a path determination service can utilize a path determining algorithm to determine a path from a start point to an end point in the level. As part of the path determination process, a virtual element can be marched or swept along the path to determine any significant variations in width, area, or volume that might impact the ability of the character to navigate along, or deviate from, the path. Information such as a radius of a virtual sphere that is able to pass along the path near these locations can be provided, along with the coordinates of the points used to approximate the path. The addition of such spatial information comes with little additional data to be transmitted, but provides an approximation of the space that can be used to determine how to move the character through the space. A path following service can then utilize the spatial information to attempt to direct the character along the path in a way that appears more natural for that character based upon factors such as a turning radius or kinematic limitation for that type of character. Such an approach can provide for a more realistic game experience without introducing additional latency or messaging that might otherwise be required to transmit the map data necessary to make such navigation decisions using conventional approaches.

Various other functions can be implemented within the various embodiments as well as discussed and suggested elsewhere herein.

FIG. 1A illustrates an example gaming configuration 100 that can be managed in accordance with various embodiments. It should be understood that gaming is only one type of application or environment that can benefit from aspects of the various embodiments discussed and suggested herein. In this example, a gaming session is hosted on at least one game server 102. The game server 102 can be a local gaming machine or a remote server operated by a game provider, among other such options. In this example the game offers multiplayer capability, whereby multiple players can utilize respective devices 108, 110, 112 to connect to the game server 102 over at least one network 106, such as the Internet, a local area network, a dedicated gaming network, a peer-to-peer network, or a cellular network, among other such options and combinations thereof. In some embodiments the player devices might first connect to a gaming service, which can cause those devices to connect to a specific game server hosting a specific gaming application, or a session for such an application. Different subsets of player devices may be directed to connect to different game servers each hosting one or more instances of the same, or multiple, gaming applications.

The player devices can join in a session, match, level, instance, or other such occurrence of the game with state data that is managed by a game state component 104 of the game server. In some embodiments one or more game servers 102 can execute the game, while in other embodiments the servers can manage game state for instances of the game executing on the various player devices 108, 110, 112, among other such options. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances the various components or systems hosting the game will be distributed. Thus, a different service might be used to determine paths through a game environment than is used to control movement of a gameplay element, or other such agent, along the path, or to animate the movement along the path. Thus, a given component not have access to all the relevant information at a given time, such as a full set of map data for a given environment in which one of many players is currently located. Having to transfer all the information might require a significant amount of bandwidth, and may introduce an unacceptable amount of latency for the game. In order to address at least some of these issues, conventional systems generate a simple path through the environment which a gameplay element can follow. This typically takes the form of a set of line segments between discrete points. While such a path requires a relatively small amount of data and introduces very little latency to transfer, the resulting motion of the gameplay element along the path may not always appear natural, which can distract from the gameplay experience. For example, a character might walk along a straight path for a while, then stop in the middle of a space, then change direction slightly to follow a different straight path. Further, because there is no information about the surrounding space there can be issued with animating the element in the space, such as where there is a narrow hallway or bottleneck that might otherwise cause a change in the movement or animation of the element if map information for that bottleneck were available. Various other issues with a segment-limited path exist as well as would be apparent to one of ordinary skill in the art.

Accordingly, approaches in accordance with various embodiments provide for the generation and management of agent paths in distributed systems. These approaches do not require much additional data to be transferred with respect to conventional segment-based path following techniques, but provide for safe and high-fidelity agent navigation and operation. Such approaches can be used in distributed systems and for components where the high resolution navigation or map data is not readily available. In at least some embodiments, minimal spatial information is efficiently extracted during path-generation, when navigation data is available. A sophisticated physical agent model can later be employed on separate physical machines on which spatial navigation data (e.g. NavMesh) is not available. Such an approach can accurately adhere to designer-controlled physical parameters, such as linear and angular velocities and turn radius, while guaranteeing safe traversal of a complex environment with no reliance on navigation-space queries.

FIG. 1B illustrates an example game environment 120 in which an agent, such as a player or non-player character of the multiplayer game of FIG. 1A, is to navigate. As discussed, there can be a set of map data 122 that includes an area bounded by at least one boundary 124, as may be defined by walls, buildings, or other such objects or elements through which the agent may not pass. Accordingly, it can be desirable to obtain a path through which the agent may pass from a starting point to an ending point, without violating (e.g., completely passing or crossing) any of the boundaries. A path generation component or service can utilize information such as the start point, the end point, and the border information to determine a patch 126 through the area. As discussed in more detail elsewhere herein, the path can also take into account various kinematic parameters for the agent to be navigated, such as a size, turn radius, or extent or type of available movement, among others. In some embodiments, the path can be approximated using a set of points defining a series of line segments 142, as illustrated in the view 140 of FIG. 1C. As discussed, however, such a path does not provide any information about the surrounding boundaries or space that would enable realistic animation or movement to be provided if the space would not otherwise allow for such movement, such as where there is a sharp turn or bottleneck that might otherwise interfere with the kinematic limitations or natural movement of the agent along the path.

Accordingly, approaches in accordance with various embodiments can attempt to provide additional data that can be used to more naturally move an agent through the space according to the generated path. FIG. 1D illustrates an example view 160 of one such approach, wherein the size of a path following object is determined for at least a subset of relevant points along the path. In this example the path following object is a virtual circle or sphere that can be swept or moved along the generated path 126 within the defined space. In some embodiments, the sphere will be given a default size, which corresponds at least in part to the size, shape, or kinematic limitations of the agent that is to follow the path. Path information, which may relate at least to the width of the space at a given point along the path, might then only be included where only a sphere of a smaller size, or having a smaller radius, would be able to fit through the space. For such a point, size information such as a radius, diameter, circumference, or other such measure of size or distance can be used. This can be used at, for example, the beginning and end of a bottleneck location in the space where the width is at least somewhat limited, and might impact or restrict the movement of the agent at that location. Such an approach utilizes a very small amount of additional information, providing width information for locations along the path there the size or shape of the space may impact the following of the path.

Width, size, or distance information can be advantageously provided for other points as well in at least some embodiments. For example, a shape such as a sphere may be swept along the path, where the radius of the sphere may be allowed to change to enable the sphere to have the largest size possible at any given location along the path. The radius can then be stored for any or all points along the path, as illustrated in FIG. 1D, which provides a relatively accurate overview of the space with little additional data required. For approaches that utilize coordinates for such points, only one additional value would be needed per point that corresponds to the radius or other such measure. As mentioned, radius information might be included with coordinates for a point along the path if the point represents a location where an aspect of the space may impact the motion of an object or agent near that location. In other embodiments points might be selected for radius information at regular intervals, or near locations where the width or shape changes significantly, among other such options. As illustrated in the example view 160 of FIG. 1D, the combination of radius information along with path coordinates can be used to generate a set of circles or spheres 162 along the determined path 164, where the overall area, volume, or shape approximates the available space, while including very little additional data to the path coordinates, and without requiring access to the potentially high resolution or large volume map data.

As mentioned, one approach is to first determine a path through a space, such as by using a conventional path finding algorithm between a start point and an end point, or any other set or number of specified points or locations in a relevant space or environment. The space information can then be performed in a post-processing step, such as by sweeping or marching an object along the path to determine information about the space. It should be understood, however, that the information can be obtained in a single path generation or determination process without a separate post-processing step in at least some embodiments.

Figure 2B:
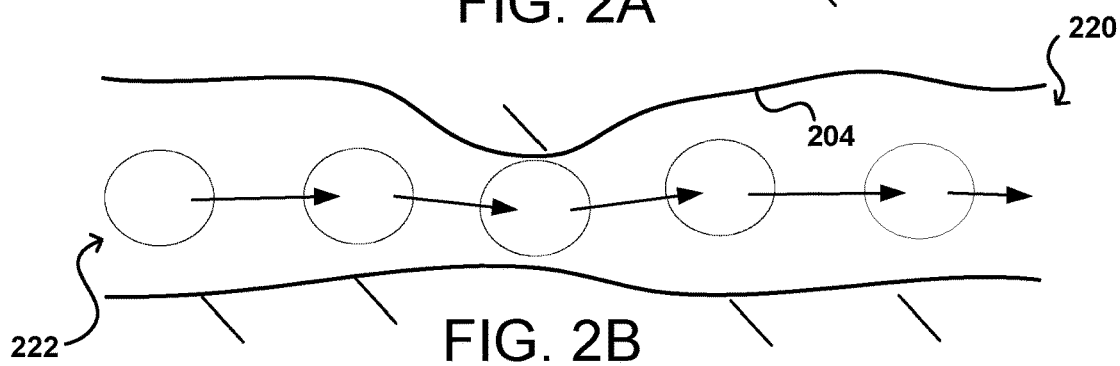

FIG. 2A illustrates an example path determining approach 200 that can be utilized in accordance with various embodiments. In this example, a path finding algorithm is used to find a path 202 between a start point and an end point within the bounds 204 of a specified environment. As mentioned, this path may be a simple path that does not include any special information. Accordingly, approaches can be used such as illustrated in the example situation 220 of FIG. 2B, wherein a virtual object 222 such as a circle or sphere is swept along a path generated between boundaries of the specified space 204. It should be noted that the sweeping can be performed algorithmically and/or through mathematical processing and simulation, and that no actual animation or graphical rendering need be performed in at least some embodiments. In this example a sphere of a determined size is swept along the path. The size of the sphere can be based upon factors such as a size and shape of an object to be navigated along the path, as well as potentially kinematic parameters for the object, as may dictate space requirements for specific movements or actions. In other embodiments the virtual object to be swept may have a default size or shape determined for the relevant process or space, etc. In this example, the sphere of the default size is able to pass along the path without contacting any objects, walls, or other elements of the environment. In some embodiments such a situation would enable the path to be provided without any additional radius information, a single radius can be provided for the first point and no subsequent points since the radius would not change, or each point can include radius information, among other such options.

Figure 2C:
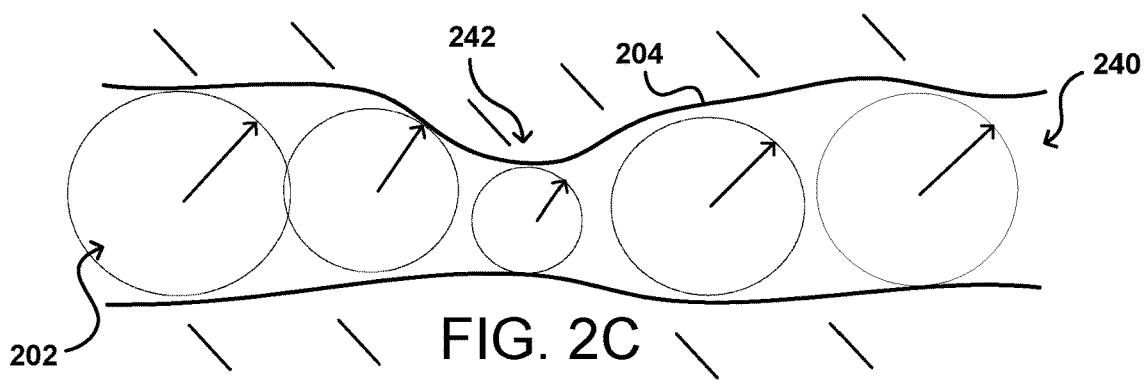
Figure 2D:
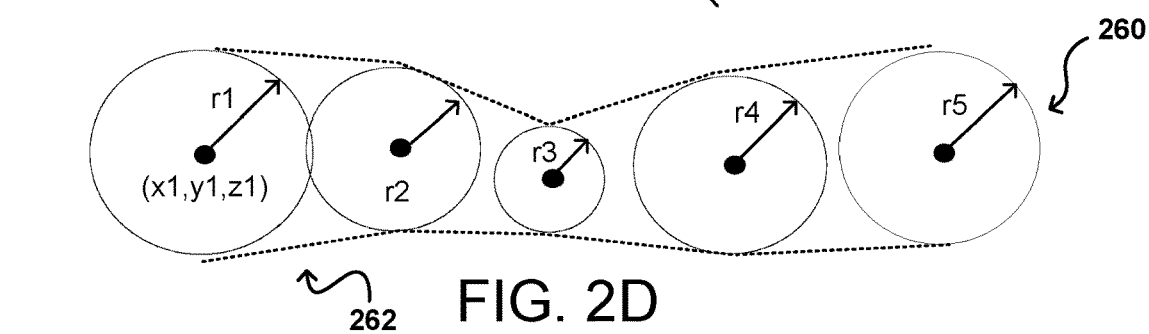

In the example situation 240 of FIG. 2C, the default radius of the sphere being swept is larger with respect to the width of the space along the path. Thus, when reaching a bottleneck location 242 where the sphere is unable to fit with at the default radius, a new radius can be determined for a sphere that is able to pass through the bottleneck. A single sphere can be used for the narrowest point, a pair of spheres can be used to designate the beginning and end of the bottleneck, or a set of spheres can be used to provide a better sense of the shape and size of the bottleneck, among other such options. The example situation 260 of FIG. 2D illustrates information that might be supplied for such a pathway. Coordinate information (e.g., (x,y,z) for Cartesian coordinates, although polar or other coordinate systems can be used) can be provided for each point, which can be in two or three dimensions depending upon the type of environment or implementation in some embodiments. Radius information can then be provided as a fourth value for at least a subset of the points, in order to specify the size of a sphere that could be contained within the space at that location. Thus, by including five additional values that provide the approximate sphere size and shape at various locations along the path, a relatively accurate approximation 262 of the shape and size of the space along the path can be obtained. While such an approach will not provide fine detail, the approximation should be sufficient in most cases to allow for natural animation of an object through that space and along the path with minimal collisions or other undesired interactions, and can provide significantly more detail and opportunity for natural animation than a conventional segment-based path approach.

Figure 2E:
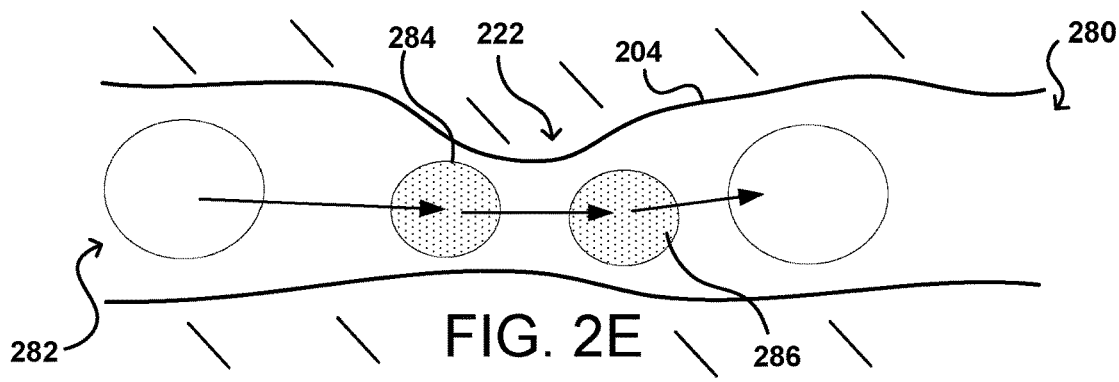

As mentioned, in some embodiments the radius information (or other distance values) might be included only for specific points along the path. As illustrated in the example situation 280 of FIG. 2E, the virtual sphere 282 was swept along the path and a bottleneck location 242 identified. A point 284 might be designated near the beginning of the bottleneck where a sphere with a smaller radius would be required. A second point 266 can be designated at the end of the bottleneck 242, beyond which the sphere might be able to return to a default radius value. In this way, the additional radius values only need to be added for the two relevant points 284, 286. In some embodiments points will still be determined at regular intervals along a generated path, but additional points or nodes can be added for bottlenecks or other such features where spatial information may be of value. An object moved along the path can be guided with sufficient information but little extra overhead or latency.

The width or space information can be important for a number of reasons. As mentioned, using straight line segments can look unnatural, which can degrade the experience when playing a videogame or being engaged in a virtual reality experience. It would be preferable to allow for some level of deviation from the segment-based path, to allow for motions such as natural turns based on the kinematic aspects of the object. For example, an elephant would generally need a larger turning radius than a mouse, and would need more room to change direction. It would be desirable in at least some embodiments to be able to do some amount of curve fitting or navigation function application that allows for natural movements that generally follow, but are allowed to deviate from, the designated path. Other factors can come into play as well, such as speed or acceleration/deceleration, where a speeding racecar may need a substantially different path to make a turn than would a dog on a leash. Having the additional space provided by the radius information, or other distance values, provides a two- or three-dimensional space in which a path can be followed, animations rendered, etc.

Figure 3A:
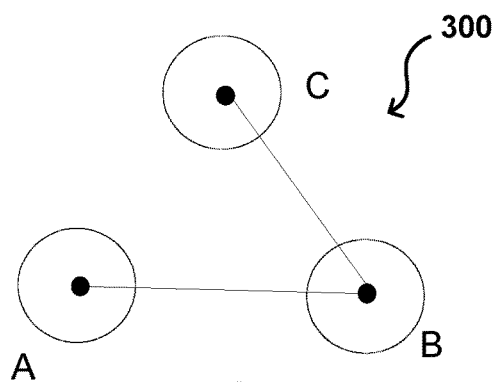
FIGS. 3A, 3B, 3C, and 3D illustrate an example approach to addressing kinematic limitations for a gameplay element that can be utilized in accordance with various embodiments.
Figure 3B:
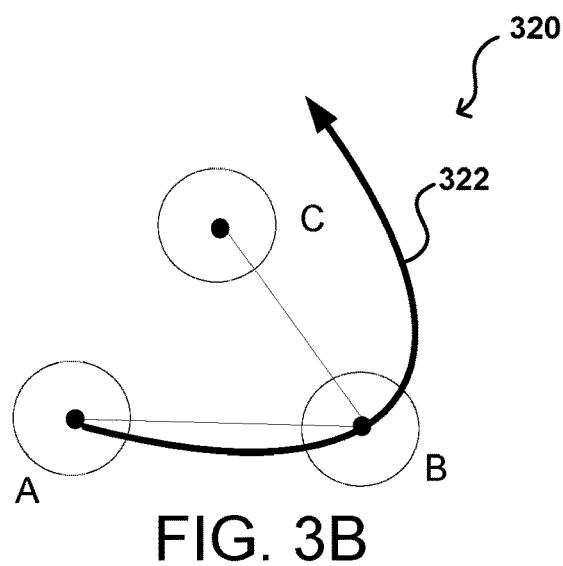
Figure 3C:
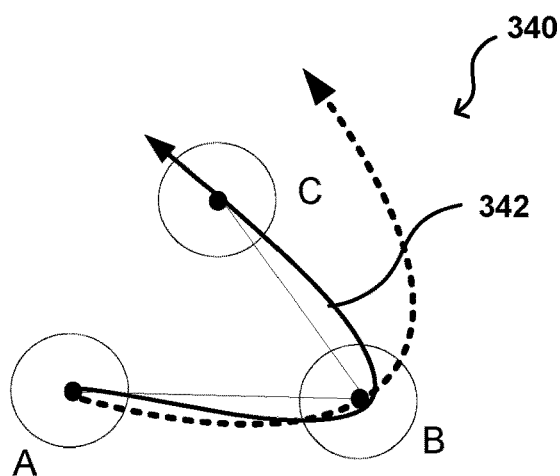
Figure 3D:
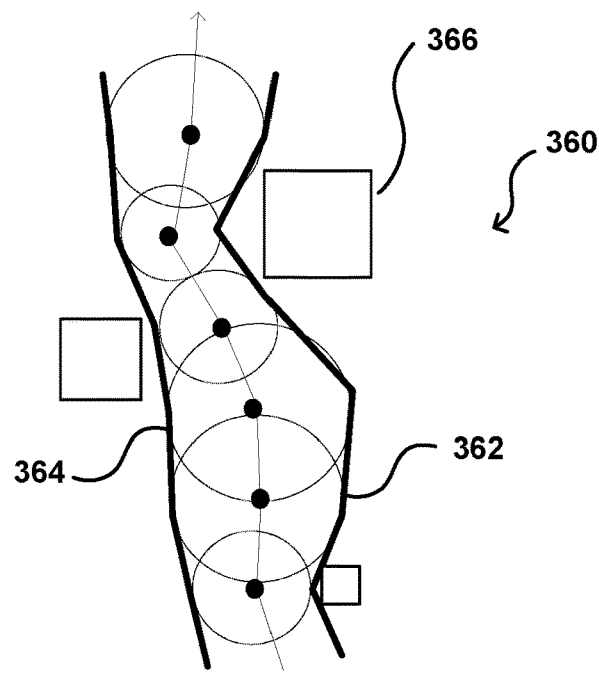

For example, consider the path 300 illustrated in FIG. 3A. In this example there are three points A, B, and C that define a path along a curve. The radius of the respective circles indicates the approximate width of the path at the relevant locations. Given the extra space defined by the spheres, or circles in two dimensions, it can be preferable in at least some situations to cause an object following the path to not stop and rotate in place per the segment path, but instead take a more natural curved approach along the path near point B. It might be the case, however, that due to factors such as the speed, deceleration capability, and kinematic constraints of the object to be moved, such as a robot or game character, that the natural curve 322 of motion for the object cannot fit within the space, even as defined by the respective circles, as illustrated in the example situation 320 of FIG. 3B. In some embodiments, an overlap of the trajectory for the object and the border for the corridor can be detected, which can cause an adjustment to be made to the path taken near the overlap region. In such an example, an attempt can be made to come as close to the natural motion as possible, while remaining within the constraints set by the circles along the path. Thus, as illustrated in the example situation 340 of FIG. 3C, a new path 342 can be followed that has a not quite natural motion near point B, but is as close to the natural motion as reasonably possible within the determined space. As illustrated, there is an unnaturally sharp curve near point B, but the remainder of the path would fall within natural motion. Thus, curve fitting can be applied to the extent possible given limitations of the space and the agent being navigated, but some compromises will need to be made where the limitations otherwise constrain, limit, or prevent the natural motion. The motion should still be more natural, except in extreme cases, than would be possible using a segment-based path only. As illustrated in the situation 360 of FIG. 3D, such information can be used to generate control information for an agent through bounds 362, 364 that can be approximated using the coordinate and radius information for the points of the determined path, which avoid collisions with elements 366 in the environment that might be near the path in the environment. This is the corridor through which the motion can be constrained in at least some embodiments.

Figure 4:
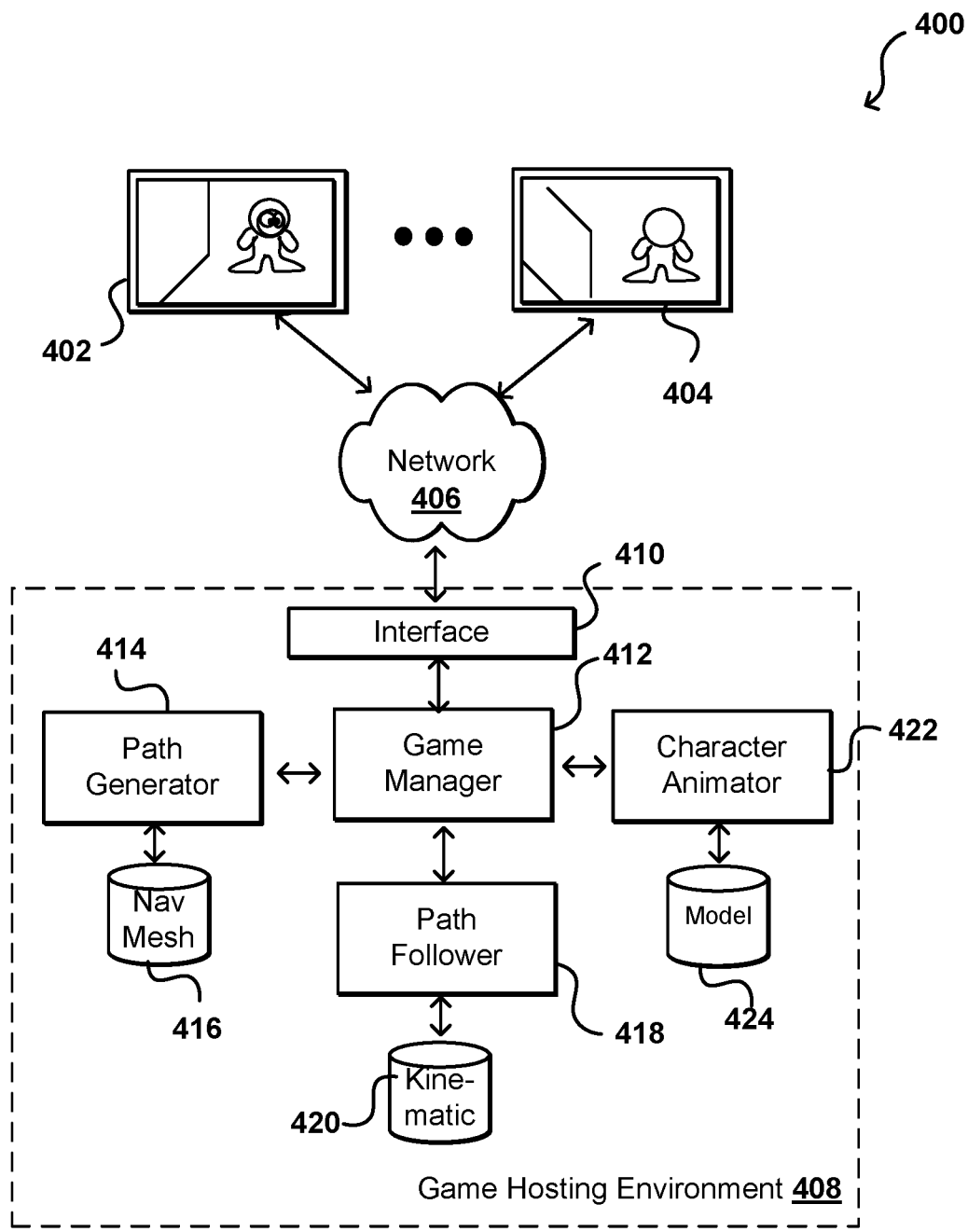
FIG. 4 illustrates an example system for performing path management for a game that can be utilized in accordance with various embodiments.

FIG. 4 illustrates an example distributed system 400 that can be utilized for path generation and navigation in a gaming environment. As mentioned, aspects of such a system can be utilized for other navigation purposes as well as discussed and suggested herein. In this example, player devices 402, 404 are able to submit requests and game state information across at least one network 406 to a game hosting environment 408, which can include game servers and other such components as discussed herein and known for hosting gaming applications and sessions. It may be desirable as part of the game to animate a gameplay element, such as a player character, non-player character, or graphical game object, through a gaming environment. As mentioned, this can involve requesting a path for the object, then causing the object to follow the path and rendering the corresponding animation for display as part of the game. In some embodiments this can all be done on a single game server, or even on the client devices themselves. In this example, however, the resources of the game hosting environment 408 are part of a distributed system, and different aspects of the game are managed or provided by different systems or services. While illustrated as part of a single environment, it should be understood that this is a logically-designated environment and that the various components can be in the same or different geographical locations in various embodiments. The various systems and services can also be provided by a single provider or multiple providers, etc.

In this example, a path request received to an interface 410 of the interface layer would be directed to a game manager 412, such as a primary game server in some embodiments. An initial path request for a game environment can be directed to a path generator 414, which has access to the relevant map or space data for the environment, as may be stored in a local repository 416. For games, this data can correspond to navigation mesh data, among other such options. A navigation mesh, or NavMesh, generally refers to a data structure that can be used to aid agents in locating navigation paths thorough complex environments. The path generator can utilize a pathfinding function, such as A* or dijkstra, to determine a path from a starting point to an ending point, as may be specified by the request or provided by the game manager as associated with the request. The path generator in this example will also sweep the path, or march an object along the path, to determine path width information or other spatial information for the environment, such as the radius values discussed previously. The resulting data provided from the path generator 414 back to the game manager 412 can then be a set of path points, where each path point includes a set of coordinates in two or three dimensions. One or more of the path points can also include spatial information, such as a radius of a sphere able to pass through the environment and along the path at the relevant point. As mentioned, in some embodiments the path generator might sweep an object having a size and/or shape based at least in part upon one or more aspects of the object to be navigated, such as a size, shape, or kinematic limitation of the object.

The path point data can be passed from the game manager 412 to the path follower 418. The path follower can be responsible for taking the path information and determining how to move the object along the path. This can include, for example, determining how to move the object based on a current speed of the object, progress of a player in the game, state of the game, or other such information. For example, a non-player character might be walking with a player character, and might only advance up to a certain point beyond a current location of the player character in the game environment. Similarly, if the object is something that is propelled by a player character, then progress might be dependent upon player action, among other such options. The path follower 418 receive the path information and process the path information using kinematic and other information received, or stored, for the object to be moved along the path. In many instances information about the size, shape, and kinematics of an object might be received once, once per session, once per path, etc., then stored to a kinematic data repository 420 or other such location for use in subsequent movement determinations along the same path or other such paths. In some embodiments this may include information stored for a type of character or object, such that a request only needs to provide an identifier for a type of character to receive the path following information. The path follower can use the kinematic data to adjust the animation to account for limitations in natural movement of the agent with respect to the environment, such as to utilize an unnatural motion for the agent along at least a portion of the path, etc.

The path follower can generate the motion information for the object, which can then be passed back to the game manager. In some embodiments the information can be passed back to the client devices for animation and rendering, but in this example the movement information for the object is passed to a character animator 422, or other animation service, that is able to render or otherwise generate animation data using the navigation data from the path follower and graphics or animation data for the agent, such as may be stored in a character model repository 424 or other such location. The animation data can then be provided back to the game manager 412, who can make it available to the relevant client device. In some embodiments an animation may be generated for a multiplayer environment that will potentially be available to all devices participating in a gaming session, while in other embodiments the animation may be specific to a particular player device, among other such options.

As mentioned, such approaches can be used to provide path and navigation for other purposes as well. The agents can be physical or virtual, and the path can be a path through a real world environment or a virtual environment. For example, such an approach can be used to navigate a robot through a real world space with objects and defined boundaries. Such the robot can be any autonomous system or device that is at least partially controlled through a computing system, where various portions of the computing system may be provided through distributed resources. The path might be a two-dimensional path along a floor or a three-dimensional path through a building or warehouse, for example, which might be navigated by a vehicle such as a drone or other unmanned aerial vehicle (UAV). Various other agents can be navigated using such information as well as discussed and suggested herein, and as would be apparent to one of ordinary skill in the art in light of the present disclosure. Such information may also be useful for any navigation to be performed through an arbitrary space, where detailed information about the space may not be readily accessible.

As mentioned, the ability to have information about the space that allows deviation from a fixed path allows for some flexibility and natural movement. For example, a virtual horse that is to navigate along a corridor will appear more natural when animated if able to have flexibility in the animation of how it controls or adjusts its weight, how the horse takes corners, how the horse comes to a stop, etc. Limiting such movements to those that can be animated over a fixed or rigid path can cause the motion of the horse to appear unnatural, which can be distracting for players of a game, or at least can reduce the sense of realism for the players. While a game manager or device might be able to make frequent spatial queries in a closed system, such an approach is not always practical in a distributed system as discussed herein. While techniques utilizing a funnel algorithm, string pulling algorithm, or other such path following technique can provide information that can prevent the horse from walking off a cliff or walking into a tree, for example, these algorithms cannot function properly without at least some information about the space surrounding the path of motion. Obtaining spatial data with the coordinates of the path enables at least some amount of fidelity and robustness to be obtained from the path following process.

It should also be noted that the same path might be used for multiple characters or agents through the same location, but those characters may have very different kinematic, physical, or locomotion constraints. Thus, even though a single set of path points may be used, the actual path followed by the different agents may vary significantly. In such instances a path follower service may receive separate requests for each agent, or type of agent, and may return different path following information for each. As mentioned, the angular, linear, acceleration, and deceleration properties may vary widely, such that the actual paths taken by the various agents may vary widely as well, which can help improve realism if a number of agents are navigating the corridor and move differently based on their different capabilities.

Path information can also be used with predictions utilized for latency in multiplayer games. In many instances, a first player will submit a request to join a session of a specified gaming application supported by a game server. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant game server, such that the game state can be updated by the game state manager, and the updated game state information can be propagated to the various player devices such that the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

In an attempt to manage the issues with latency, many conventional gaming services implement static gameplay prediction logic. Traditionally this prediction logic is manually generated by a developer around a set of player data. In one example, the prediction can be a linear extrapolation using a player's prior positions, including a rate or type of movement. This can then be used to determine both the direction and the speed, along with other factors such as a maximum speed of a type of character and other such data. Using one example prediction model, a first player (Player A) can be at a first position and a second player (Player B) at a second location. This corresponds to the last position reported for Player B as received to a device corresponding to Player A. If player A throws a ball to Player B at the last reported position, along a given trajectory, the throw would miss because at the time the ball arrives in the game Player B is at a different actual location. In order to have the game appear to be in real time, the game could use the last reported position which would show that the ball was successfully delivered, but would then have a problem when the synchronized gameplay data shows the player actually moved to a current actual location. By the time the action data gets to the device of Player B, the trajectory would have caused the ball to miss Player B. There would be difficulty in reconciling the two local gameplay states after the fact.

As mentioned, an approach to minimizing the latency impact, resulting in events happening at different times on different devices, involves attempting to predict the location of Player B at a near future point in time, and make determinations based on the predicted location(s) instead of the last reported location. Based on the current location and the recent prior locations, a future prediction can be extrapolated by a fitting a linear function, curve, or exponential function, etc., to a set of recent points. This can include a time component as well in at least some embodiments. In this example, a linear extrapolation (or interpolation) is applied to the recent location points to determine a predicted future location of Player B based on Player B's recent movement and information known about the game, the type of character controlled by Player B, and other such information. In this way, Player A would be determined to successfully target Player B by throwing the ball along a different trajectory, which would arrive at the predicted location at the associated time. Such predictions can be used to determine when interactions should occur, including many of those discussed herein. In some embodiments the rules or expressions for an interaction might differ for predictions in such situations. For example, a tag might be applied to indicate that a type of interaction is low priority, where it may not matter if the game does not get it exactly right, such that a certain confidence in a prediction can be used to trigger an interaction. For other, more critical interactions, there may be little to no prediction allowed, or certain actions may be performed until an actual interaction can be determined with at least a minimum amount of certainty, etc.

Path finding can be used advantageously for such a situation as more accurate predictions can be made as to where a player will be located. Further, such path information can be used to navigate objects more naturally along a path, such as by having a heat seeking projectile follow a natural path through a corridor instead of following a segmented path. By being able to use the path and space information to more accurately animate and navigate the object, and by being able to utilize this information in the prediction algorithm, more natural gameplay can be obtained that can also account for latency issues in the distributed gaming environment.

Figure 5:
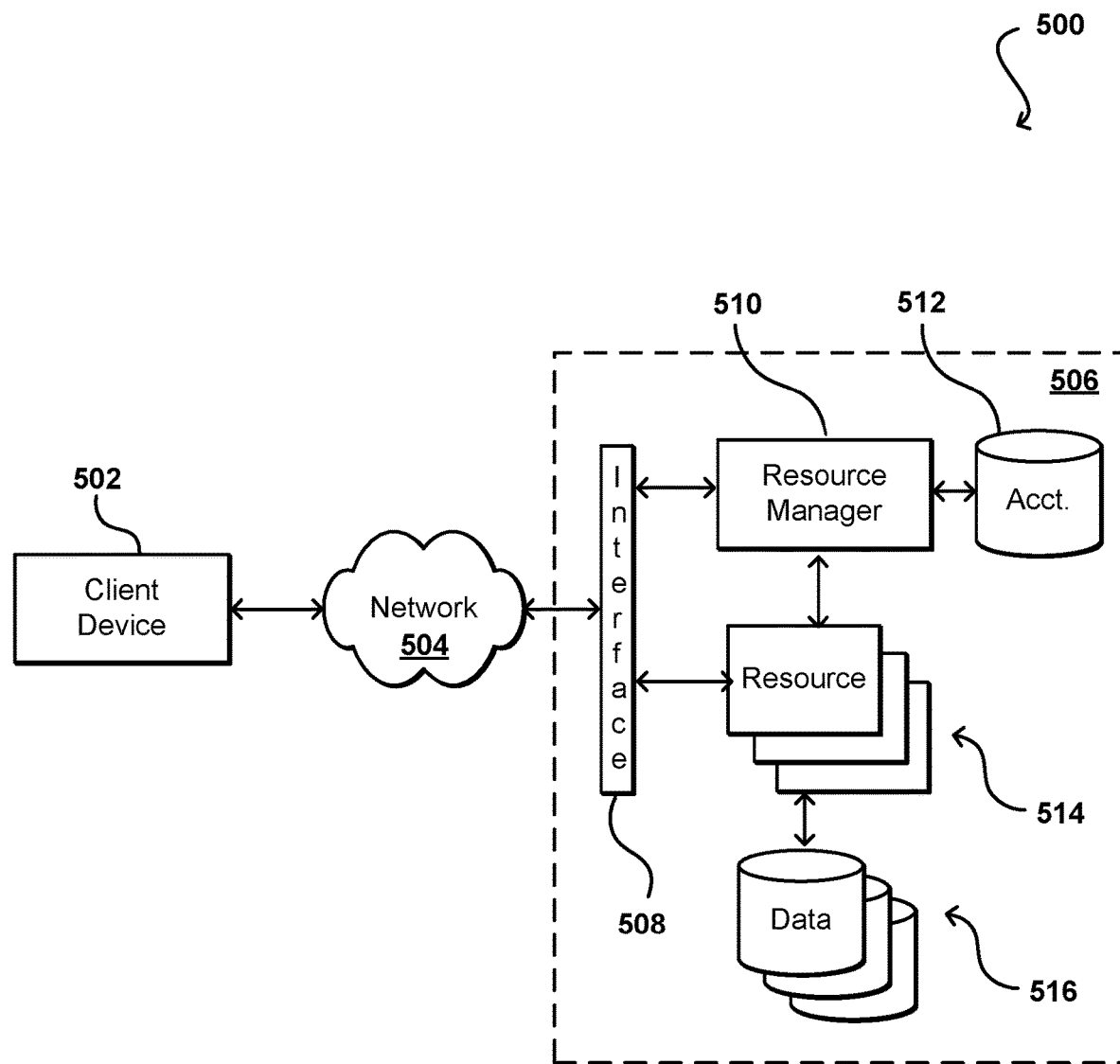
FIG. 5 illustrates an example environment in which various embodiments can be implemented.

FIG. 5 illustrates an example environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
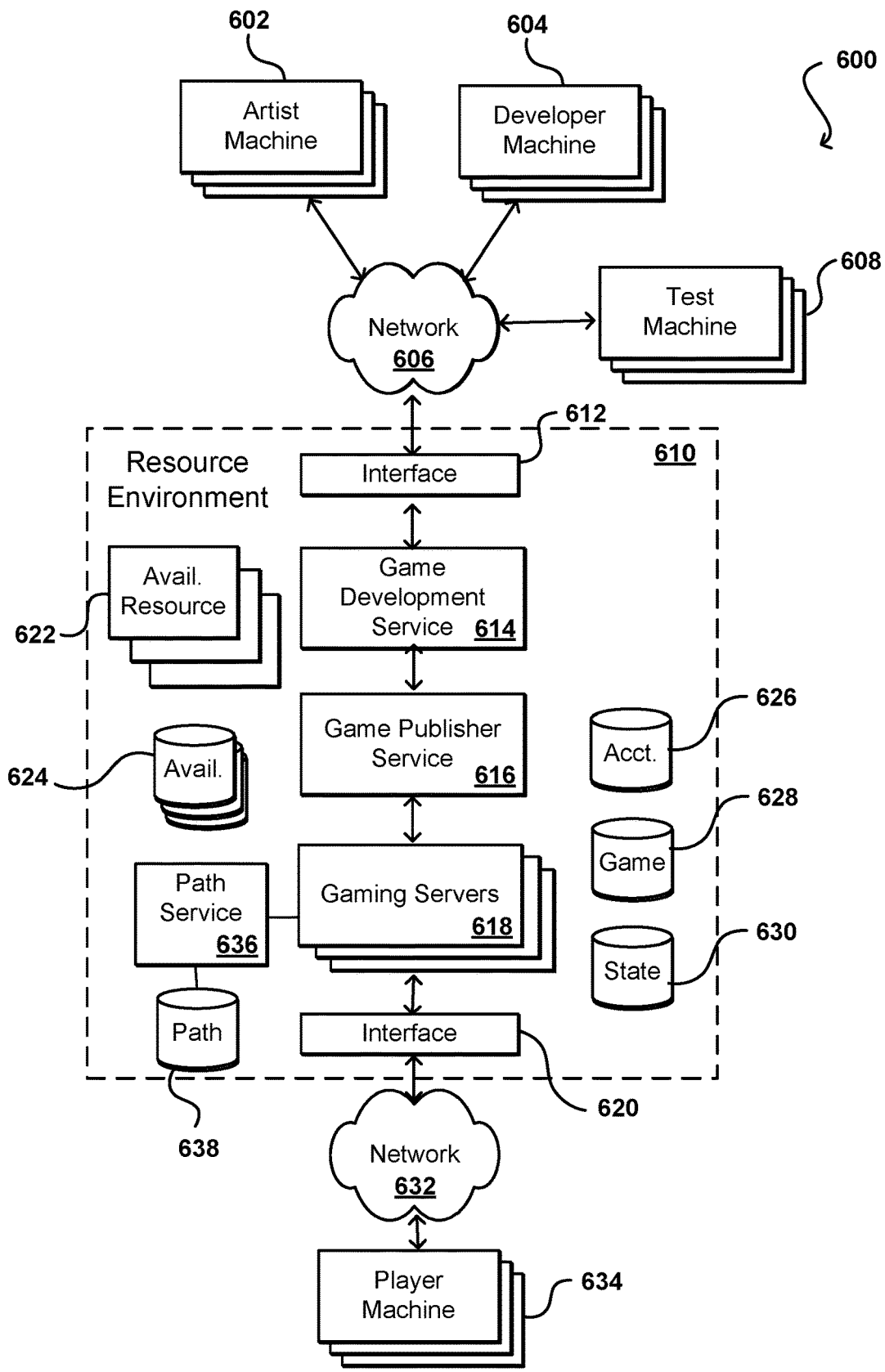
FIG. 6 illustrates an example gaming pipeline that can be used in accordance with various embodiments.

As illustrated in the example system 600 of FIG. 6, at least some of the resources can be used to support platforms and services useful in the development and providing of electronic gaming and three-dimensional graphical content, among other such options. For example, the artist machines 602 and developer machines 604 can collaborate via a game development service 614, which can be provided by a set of resources in the resource environment 610 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 628, where the repositories can include graphics files, code, audio files, and the like. The game development service 614 can also work with an account manager, or at least maintain information in an account data store 626, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 616. The game publisher service 616 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 604 or otherwise. In some embodiments the game content might be published and made available to one or more test machines 608, which may be associated with the customer, such that the customer can test various builds or versions of the game. In some embodiments feedback provided by the test machines 608 may be provided to the game development service 614, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 618 which can run the game and enable player machines 634 to access the game content over one or more networks 632, which may be different from the network(s) 606 used for game development. This can include, for example, dedicated gaming networks, the Internet, cellular networks, and the like. The player machines 634 can communicate with the appropriate interfaces of an interface layer 620 to obtain the gaming content. In some embodiments the player machines 632 will download the gaming content for execution on the individual machines, and will upload (or otherwise communicate) gaming data, messages, and other information to the gaming servers 618, as well as to other players, social networking sites, or other such recipients. The gaming servers 618 can cause state information for the various instances of the game to be stored to at least one game state repository. This can hold state for the game as a whole or for individual game sessions, among other such options. In some embodiments the game content can be executed by the game servers and streamed in near real time to the player machines 634. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the game servers 618 can work with one or more path management services 636 that can determine paths to follow in various gaming environments, as well as to assist in guiding gameplay elements along those paths in at least some embodiments. Such services can use kinematic and other motion-related information for the agents to determine how the agents should follow, or deviate from, the path to provide a more natural animation or type of movement. The path service 636 can work with the gaming servers 618 to provide different path following instructions for different types of agents following the same default path through a gaming environment. As mentioned, these services can be distributed in some embodiments, and at least some of the functionality may be performed by a game server or client device in others.

Figure 7:
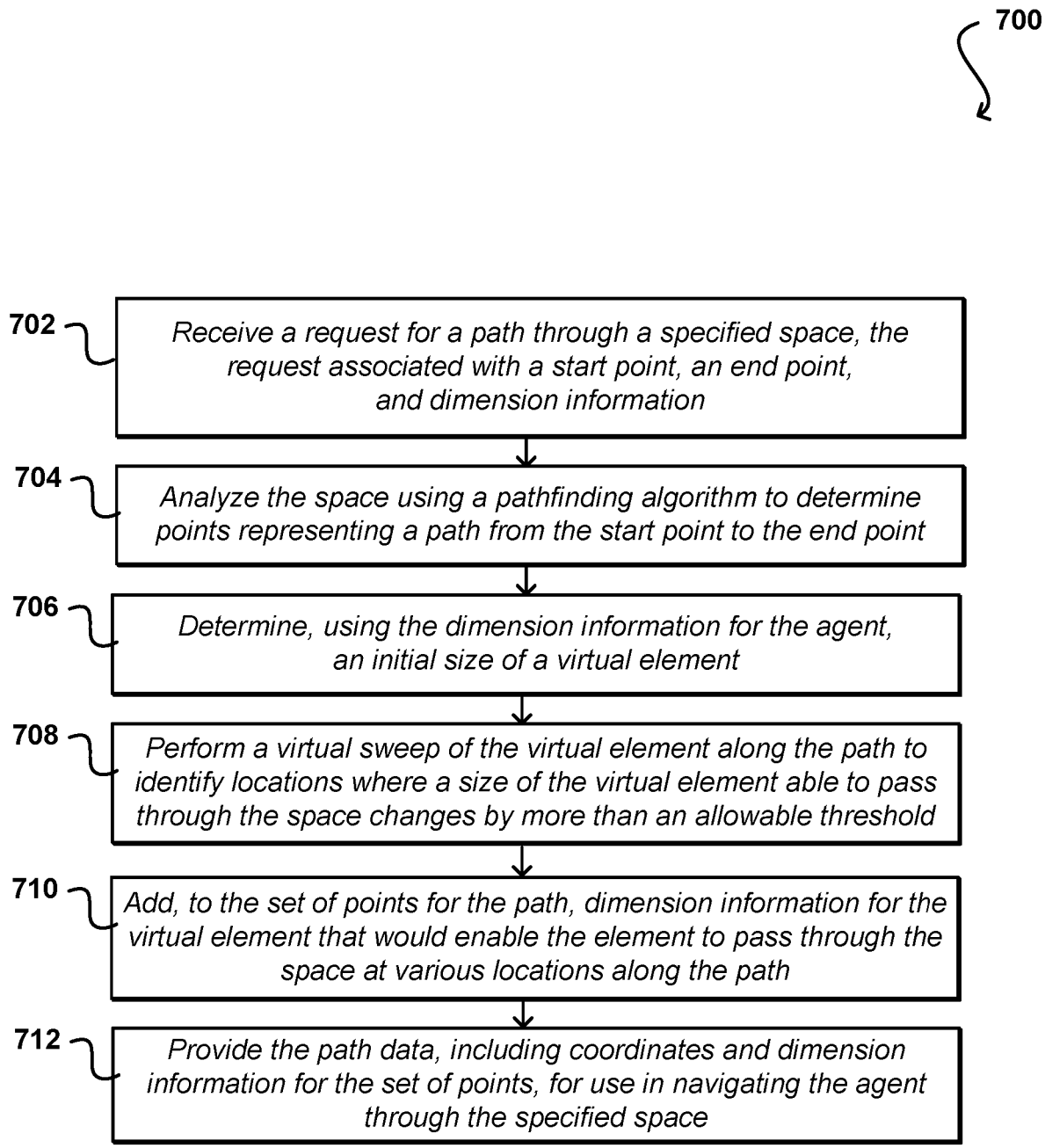
FIG. 7 illustrates an example process for determining a path through a complex environment that can be utilized in accordance with various embodiments.

FIG. 7 illustrates an example process 700 for determining a path through a potentially complex environment, such as a video game level or an arbitrary physical space, that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of environments can benefit from various path management aspects as discussed herein, as may be utilized to navigate robotic devices through physical environments, among other such options. In this example, a request is received 702 for a path through a specified space. The request in this example can include, or be associated with, a start point and an end point for the path. It should be noted that path requests can be incremental, such that the end point might be for a current portion of a path, and may serve as a start point for a subsequent portion of the path or a future path in at least some embodiments. The request can also include, be associated with, dimension information for the path. This can be agent specific in some embodiments, specifying dimensions for an agent to be navigated through the space along the path, or can specify a default or minimum size of an element to be swept through the space, among other such options. This can include, for example, size and shape information for the agent. The information can also potentially include motion data for the agent, such as turning radius, rates of acceleration and deceleration, lateral motion capabilities, and the like. The information in some embodiments can also include kinematic information, such as may relate to permissible or allowable types of motion that can be obtained for the agent, among other such options. Such information can be used to determine an amount of available space that is needed to maneuver the agent in the space. This space may not be modifiable for a physical agent, but may be able to be modified for a virtual agent, albeit with a potentially unnatural appearance or motion.

The space can be analyzed 704 using a pathfinding algorithm to determine a set of points that represent a path corresponding to the request, such as from the start point to the end point. The pathfinding algorithm can be any appropriate algorithm, such as a string pulling algorithm, funneling algorithm, A* algorithm, or other such path following technique, which can operate on a map or model of the specified space or environment. As mentioned, the set of points in some embodiments can correspond to regular locations along the path or locations where the direction of a path segment would need to change, among other such options. The points can be represented in coordinates, in two or three dimensions, and in an appropriate coordinate space or frame of reference. As part of a post-processing step in some embodiments, the motion (or other) information for the agent can be analyzed to determine 706 an initial size for a virtual element, which in some embodiments can approximate the agent. The size of the virtual element can correspond to at least the size of the agent, but may be enlarged or otherwise modified to allow for motions or movements of the agent that might be required to perform certain movements. For example, an agent may have a minimum turn radius that can be represented by the virtual element to ensure that the agent has enough room to turn or maneuver along the determined path.

Motion of the virtual element can then be analyzed along the path as determined by the set of points, such as by performing 708 a virtual sweep or march of the element along the path. This can include virtually placing the element at various points along the path or moving the virtual element continuously along the path, among other such options. An attempt can be made to identify any locations along the path where the element would be unable to fit or maneuver, at least without colliding with another object or element, at its default size. The size of the virtual element can be modified to attempt to determine a size that would fit through that location, such as the largest possible size or a size with some amount of external collision buffer. Dimension information for the virtual element at, or near, those locations can then be added 710 to the set of points for the path, where the dimension information would be associated with a respective set of coordinates identifying the location where the dimension information applies along the path. As mentioned, this could include a diameter or radius value for a virtual sphere or circle swept along the path, among other such options. This can include radius information for each point or for injected points where the width varies more than an allowable threshold amount, or variation threshold, etc. As an example a point might be injected with radius information each time the width of such a sphere varies by more than twenty percent, or more than fifty percent. The path data, including the coordinates and dimension information for the set of points, can then be provided 712 for use in navigating the respective agent through the specified space. In some embodiments the path information may be able to be reused for multiple types of agents, particularly where dimension information is included for all points of the set of points, such that the available space is approximated by a set of elements defined by the coordinates and dimension information.

Figure 8:
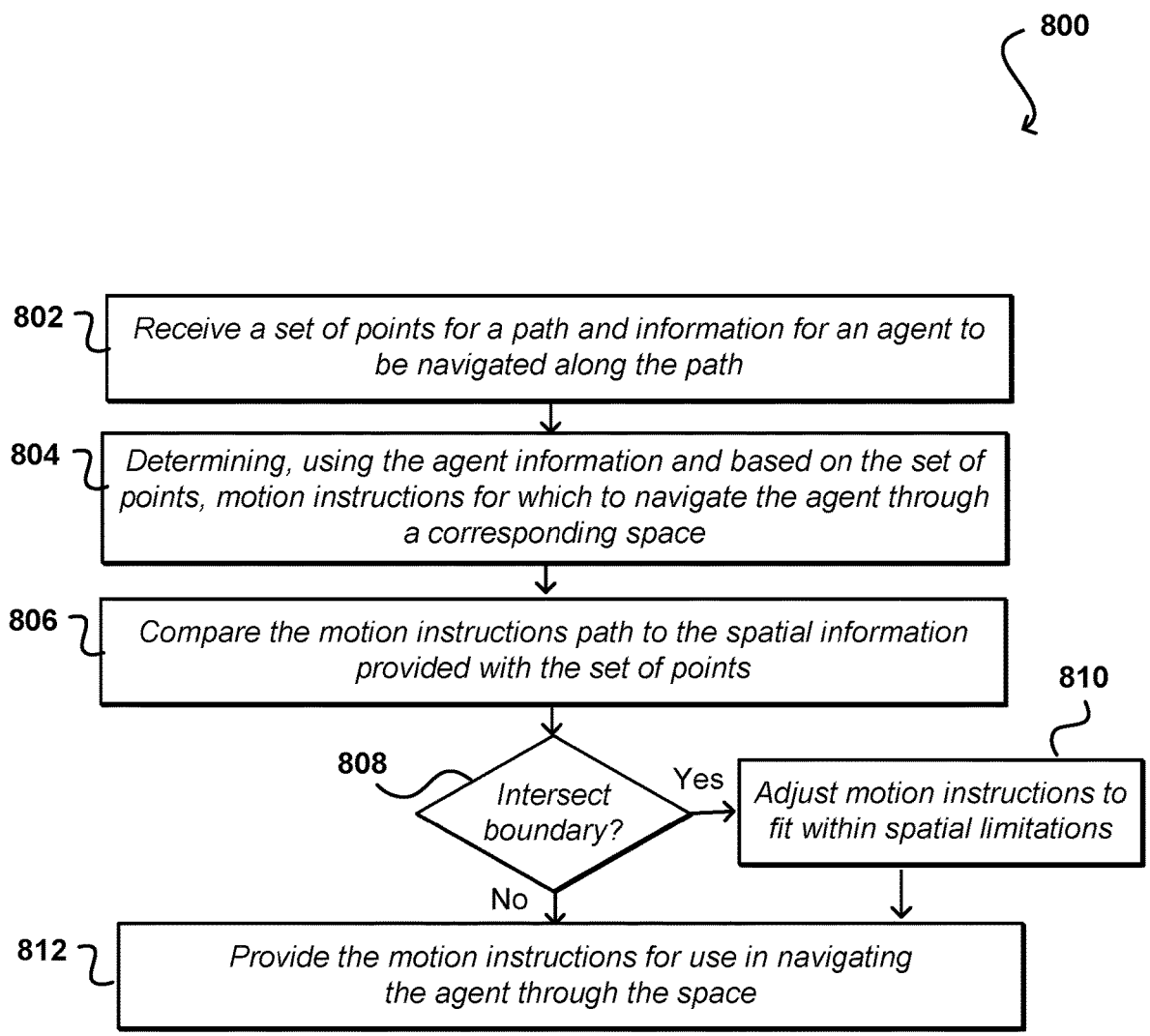
FIG. 8 illustrates an example process for causing an agent to follow a determined path through a complex environment that can be utilized accordance with various embodiments.

FIG. 8 illustrates an example process 800 for navigating an agent along a determined path through a space that can be utilized in accordance with various embodiments. In this example, a set of points is received 802 that is representative of a path through a specified space. Information for an agent to be navigated along the path can also be received or otherwise specified. The agent information can include size, shape, motion, and kinematic information, among other such data as discussed and suggested herein. This information can be used to determine 804 motion instructions along which to navigate the agent through a corresponding space, as constrained by the bounds of a corridor, for example. As mentioned, this can include analyzing parameters for the natural motion of the agent and attempting to determine motion that generally follows the determined path according to the set of points, but that deviates to account for the natural motion of the agent. This can include deviations due to size, turning radius, possible rate of deceleration, and the like. This can include various curve or function fitting options as discussed elsewhere herein.

Once motion instructions have been at least partially determined, the motion can be compared 806 against the spatial information provided with the set of points to determine whether there are any locations where the motion is likely to, with at least a minimum amount of certainty, intersect or cross a boundary, object, or element in the space to be navigated. As mentioned, the spatial information can be used to approximate locations where space to navigate may be minimal, or at least varies, and this information can be used to determine whether the agent would likely be able to navigate the space successfully along the determined control path. If it is determined 808 that an intersection, crossing, or other such collision occurs, then the motion instructions can be adjusted 810 to fit within the spatial limitations. In at least some embodiments an attempt can be made to make the adjustment as minimal as possible to allow the agent to navigate the space while keeping the motion as natural as possible. For physical agents the ability to adjust may be limited, but for virtual agents such as gameplay characters the motion can be constrained to the space while an attempt is made to keep the motion and animation as natural as possible for the respective gameplay element. The motion instructions, after any adjustments, can be provided 812 for use in navigating the agent through the space. As mentioned, the control path determination can be made using the point approximation for the path with spatial information, and without detailed data about the space to be navigated. Further in at least some embodiments the control path is provided to another component or service of the system that is able to perform animation, rendering, locomotion, or other functions that utilize the control path data.

Figure 9:
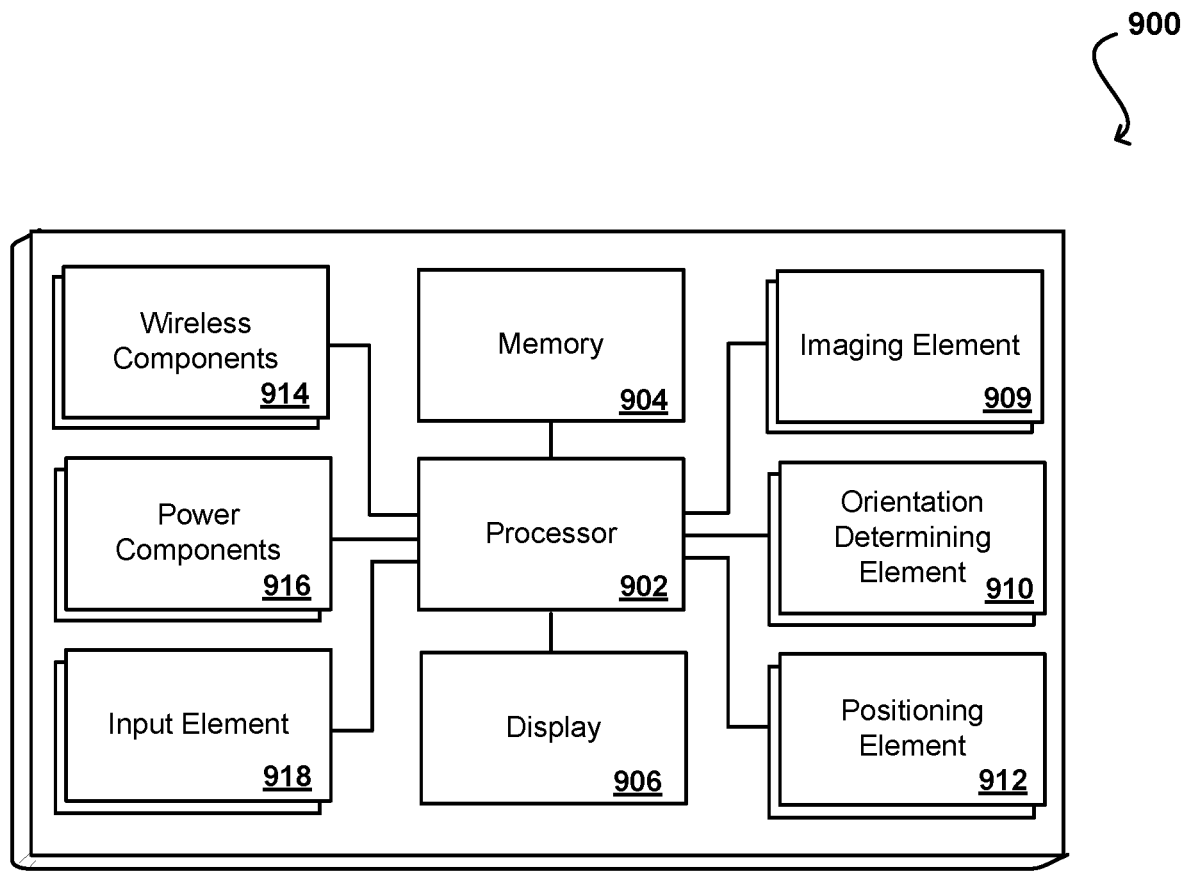
FIG. 9 illustrates example components of a computing device that can be used to implement aspects of the various embodiments.

FIG. 9 illustrates a set of basic components of an electronic computing device 900 that can be utilized to implement aspects of the various embodiments. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request for a path to navigate a game character through a virtual game space, the request specifying a start point, an end point;
   analyzing map information for the virtual game space to determine the path from the start point to the end point, the path contained within boundaries of the virtual game space;
   sweeping a virtual sphere along the path to identify a bottleneck where a path width of the virtual game space is more than a variation threshold smaller than a previous diameter of the virtual sphere;
   generating a set of path locations defining the path through the space, the set of path locations including coordinates for respective locations along the path, the set of path locations further including at least one bottleneck location including coordinates for the bottleneck and a determined radius of the virtual sphere that is able to pass through the bottleneck; and
   providing the set of path locations, wherein the game character is able to be navigated through the virtual game space along the path as constrained by the bottleneck location and using kinematic information for the game character, independent of access to the map information.

2. The computer-implemented method of claim 1, further comprising:
   receiving, to a path follower service, the set of path locations;
   determining motion instructions for navigating the game character through the virtual game space, the motion instructions determining in part on the set of path locations and modified to account for motion limitations of the game character as specified by the kinematic information, the path follower service not having access to the map information for the virtual game space; and
   providing, from the path follower service, the motion instructions for animating the game character through the virtual game space.

3. The computer-implemented method of claim 2, further comprising:
   determining that the motion instructions have at least a minimum probability of causing the gameplay element to collide with an element in the virtual game space; and
   modifying the motion instructions to cause the gameplay element to avoid the collision while retaining a maximum amount of natural motion as specified by the kinematic information.

4. The computer-implemented method of claim 1, further comprising:
   determining the path from the start point to the end point using at least one of an A* or dijkstra pathfinding algorithm.

5. A computer-implemented method, comprising:
   receiving a request to obtain a path through a specified environment;
   performing a sweep of a virtual element along the path to determine a bottleneck where a path width of the specified environment is more than a variation threshold smaller than a previous size of the virtual element;
   determining a set of path coordinates for the path;
   determining, for at least a subset of the path coordinates, spatial parameters for respective portions of the specified environment, the spatial parameters corresponding to where the bottleneck occurs; and
   providing the set of path coordinates and the spatial parameters, along with a specified motion limitation associated with a character of the specified environment, for navigation through the specified environment.

6. The computer-implemented method of claim 5, further comprising:
   obtaining a virtual map of the specified environment;
   determining respective widths of the virtual element able to pass through the specified environment; and
   storing the respective widths for the virtual element as the spatial parameters for respective path coordinates.

7. The computer-implemented method of claim 6, wherein the virtual element is one of a virtual circle or a virtual sphere, and wherein the spatial parameters correspond to a radius or a diameter of the virtual element at respective path coordinates.

8. The computer-implemented method of claim 6, wherein the subset of path coordinates correspond to locations along the path having a width varying by more than a threshold amount with respect to a prior width.

9. The computer-implemented method of claim 5, further comprising:
   determining a kinematic parameter for an object to be navigated along the path; and
   adjusting motion of the object along the path based at least in part upon width information and the kinematic parameter.

10. The computer-implemented method of claim 5, wherein the specified environment is a virtual environment or a physical environment, and wherein the path is to navigate an agent selected from a virtual element or a navigable physical object.

11. The computer-implemented method of claim 5, further comprising:
   providing the set of path coordinates using a path generator service having access to map data for the environment; and
   causing an agent to navigate along the set of path coordinates using a path follower service that does not have access to the map data for the environment.

12. The computer-implemented method of claim 11, further comprising:
   receiving, to the path follower service, the set of path coordinates and the spatial parameters;
   determining motion instructions for navigating an agent through the specified environment, the motion instructions being determined from the set of path coordinates but modified to account for motion limitations of the agent as specified by associated kinematic information; and
   providing, from the path follower service, instructions for directing the agent through the specified environment along the control path.

13. The computer-implemented method of claim 12, further comprising:
   determining that the motion instructions have at least a minimum probability of causing the agent to collide with an object in the specified environment; and
   modifying the motion instructions to avoid the collision while retaining a maximum amount of natural motion as specified by the kinematic information.

14. The computer-implemented method of claim 5, further comprising:
   determining the path from a start point to an end point using at least one of an A* or dijkstra pathfinding algorithm.

15. A system, comprising:
   at least one processor; and
   memory including instructions that, when executed by the at least one processor, cause the system to:
   receive a request to obtain a path through a specified environment;
   simulate motion of a virtual element along the path to determine a bottleneck where a path width of the specified environment is more than a variation threshold smaller than a previous size of the virtual element;
   determine a set of path coordinates for the path;
   determine, for at least a subset of the path coordinates, spatial parameters for respective portions of the specified environment, the spatial parameters corresponding to where the bottleneck occurs; and
   provide the set of path coordinates and the spatial parameters, along with a specified motion limitation associated with a character of the specified environment, for navigation through the specified environment.

16. The system of claim 15, wherein the instructions when executed further cause the system to:
   obtain a virtual map of the specified environment;
   determine respective widths of the virtual element able to pass through the specified environment; and
   store the respective widths for the virtual element as the spatial parameters for respective path coordinates.

17. The system of claim 15, wherein the instructions when executed further cause the system to:
   determine a kinematic parameter for an object to be navigated along the path; and
   adjust motion of the object along the path based at least in part upon width information and the kinematic parameter.

18. The system of claim 15, wherein the instructions when executed further cause the system to:
   provide the set of path coordinates using a path generator service having access to map data for the environment; and
   cause an agent to navigate along the set of path coordinates using a path follower service that does not have access to the map data for the environment.

19. The system of claim 18, wherein the instructions when executed further cause the system to:
   receive, to the path follower service, the set of path coordinates and the spatial parameters;
   determine motion instructions for navigating an agent through the specified environment, the motion instructions being determined based on the set of path coordinates but modified to account for motion limitations of the agent as specified by associated kinematic information; and
   provide, from the path follower service, the motion instructions for directing the agent through the specified environment along the control path.

20. The system of claim 19, wherein the instructions when executed further cause the system to:
   determine that the motion instructions have at least a minimum probability of causing the agent to collide with an object in the specified environment; and
   modify the motion instructions to avoid the collision while retaining a maximum amount of natural motion as specified by the kinematic information.

* * * * *